(12) United States Patent
Chang

(10) Patent No.: US 6,439,581 B1
(45) Date of Patent: Aug. 27, 2002

(54) SEALING STRUCTURE FOR A MIXING VALVE OF HOT AND COOL WATER

(76) Inventor: Chia-Bo Chang, No. 335, Chang-Ting Road, Lukang, Changhua Hsien (TW)

( * ) Notice: Subject to any disclaimer, the term of this patent is extended or adjusted under 35 U.S.C. 154(b) by 0 days.

(21) Appl. No.: 09/296,861

(22) Filed: Apr. 22, 1999

(51) Int. Cl.[7] ................................................. F16L 17/06
(52) U.S. Cl. ........................ 277/614; 277/609; 277/641; 137/625.4
(58) Field of Search ................................ 277/614, 625, 277/637, 641, 609; 137/625.4, 625.17

(56) References Cited

U.S. PATENT DOCUMENTS

| | | | |
|---|---|---|---|
| 3,965,936 A | * | 6/1976 | Lyon |
| 4,502,507 A | * | 3/1985 | Hayman |
| 4,687,025 A | * | 8/1987 | Kahle et al. |
| 5,060,692 A | * | 10/1991 | Pawelzik et al. |
| 5,417,242 A | * | 5/1995 | Goncze |
| 5,518,027 A | * | 5/1996 | Saiki et al. |

* cited by examiner

Primary Examiner—Terry Lee Melius
Assistant Examiner—William L. Miller
(74) Attorney, Agent, or Firm—Pro-Techtor International Services

(57) ABSTRACT

An improved sealing structure for a mixing valve of hot and cool water is disclosed. A first trench with an approximate V shape is formed on the upper surface of the lower wall along the peripheral rim of the water inlets and water outlet and is retained with a proper distance with the peripheral rim of the water inlets and water outlet. A second trench with an approximate inverse V shape is formed on the bottom surface along the peripheral rim of the water inlets and water outlet and is retained with a proper distance with the peripheral rim of the water inlets and water outlet. The shape of the first trench is completely symmetric to the second trench on the lower wall of the casing. A sealing ring is installed between the surface of the lower wall of the casing and the bottom surface of the fixing disk and has a symmetric shape with respect to the aforesaid trenches. Thus, the sealing ring can be engaged with the two trenches. During assembling the aforementioned sealing structure, the fixing disk covers the structure downwards to slightly press the sealing ring so as to be tightly sealed within the trenches, and the sealing ring can be engaged to the trench with a deeper depth so to be positioned therein. The structure of the present invention can be assembled easily.

5 Claims, 3 Drawing Sheets

SEALING STRUCTURE FOR A MIXING VALVE OF HOT AND COOL WATER

BACKGROUND OF THE INVENTION

1. Field of the Invention

The present invention relates to an improved sealing structure for a mixing valve of hot and cool water, and especially to a mixing valve, wherein the sealing structure between the fixing disk and the lower wall of the casing is improved.

2. Description of the Prior Art

The prior art faucet mixes and regulates hot and cool water through a mixing valve, as shown in FIG. 4. In the structure of the mixing valve, two overlapped ceramic disks 51 and 52 are installed within a casing 53. One of the disks is fixed and another disk is controlled by a lever to move on the fixing disk. The movable disk 51 is installed with a mixing chamber 511 of cool and hot water, which is selectably connected one or two openings of water inlet to water outlet. In general, the fixing disk 52 is installed on the lower wall 531 of the casing, and two openings of water inlet are installed on the disk 5 and are connected to the separated hot and cool water guide openings (not shown in FIG. 4). An extra opening 521 is further installed on the disk 52 for transferring water to pass through a water outlet 532 to the opening of the faucet. Moreover, a sealing ring 55 is installed between the periphery of each water inlet and the water outlet and the lower wall of the casing 53 for providing sealing function between the fixing disk and the lower wall of the casing and between the water through holes.

In general, the sealing ring 55 is installed and positioned in the trench 533 on the lower wall of the casing and is protruded from the trench so as to resist to the bottom surface of the fixing disk 52. By the disk to compress the sealing ring 55 so as to achieve a required sealing effect. The sealing effect completely depends on the compressing force of the disk to the sealing ring. However, in some practical application, water flowing through the water through hole has larger flow speed or pressure so that the sealing ring displaces. Probably, one part of the sealing ring moves out of the fixing position or the trench. This abnormal condition will cause the sealing ring to be clamped between the disks and the positioning trench and then is deformed or worn so as to loss the required sealing function. Furthermore, in this way that by disks to compress and regulate the sealing effect of the sealing ring, it is probably that the fixing disk 52 and the movable disk 51 are tightly compressed with one another and thus the valve is difficult to be operated.

In order to overcome the defect in the prior art sealing device, various designs are disclosed. For example, Taiwan Patent No. 84205827 "an improved sealing structure for a mixing valve of hot and cool water". As shown in FIGS. 5 and 6, a concave portion 535 having a shape with respect to that of the sealing ring 55 is installed on the lower wall 531 of the casing so that the sealing ring is located in the concave portion 535 not to protrude out of the edge of the concave portion. Then, by a rib 526 protruded downwards from the bottom of the fixing disk 52 and having a shape with respect to that of the concave portion so that during assembling, the rib 525 is guided into the concave portion 535 to steadily press the sealing ring 55. Thereby, the deformation of sealing ring is avoided and the sealing effect of the components are prevented.

In general conditions, by the aforesaid structure, the deformation of sealing ring is prevented, and a preferred sealing effect is attained by a slightly pressing force.

However, this structure change needs to change the space formation of the lower wall 531 on the casing of the mixing valve, and the formation of the fixing disk 52 is also necessary to be changed. However, it is appreciated that the mixing valve of cool and hot water are used widely and the specifications of the parts are defined. Thus, most of the components are used commonly so as to reduce product cost. However, the design of the aforesaid patent must change some components, thus the sizes and molds must be redesigned, thus the cost is increased.

Another, during assembling these components, the rib 524 on the fixing disk must be embedded into the concave portion 535 on the lower wall of the casing accurately so to be properly pressed on the sealing ring 55 to attain a required sealing effect. Thus, it is difficult to be assembled. Moreover, during assembling, if the rib can not be accurately positioned to the concave portion, then sealing function will be lost completely.

Furthermore, according to the design, wherein the sealing ring is disposed in the concave portion on the lower wall of the casing, and then is pressed by the rib on the bottom surface of the fixing disk, the substantially sealing function is only limited at the strips of the outer most strip of the sealing ring (which is defined by the outer wall of the concave portion on the lower wall of the casing). However, the no sealing effect is generated by the inner strips on the periphery of water through hole of the sealing ring. Since for these strips, as the prior art sealing strips, the function of sealing is fully determined by the applied pressure. Thus, the defect as in the prior art is also existed.

SUMMARY OF THE INVENTION

Accordingly, the object of the present invention is to provide an improved sealing structure for a mixing valve of hot and cool water, wherein the sealing ring may be tightly engaged with a slightly pressing force. Therefore, the defect in the prior art sealing structure is avoided.

Another object of the present invention is to provide an improved sealing structure for a mixing valve of hot and cool water, wherein the strips of sealing ring is firmly positioned and has an identical sealing effect.

Another object of the present invention is to provide an improved sealing structure for a mixing valve of hot and cool water, wherein the assembly of components and the sealing ring can be performed easily and rapidly. After being assembling, the sealing ring is accurately positioned and has a preferred sealing effect.

A further object of the present invention is to provide an improved sealing structure for a mixing valve of hot and cool water, wherein the sealing between a fixing disk and the bottom of the casing is improved so that the cost and time are saved.

According to the aforementioned object, the bottom surface of the fixing disk and the lower wall of the casing are installed with respective first and second trenches having shapes symmetric to the trench of the sealing ring. The first and second trenches have wider openings and have a V shape and an inverse V shape cross section, respectively. Therefore, as the structure is assembled, the lower half of the sealing ring under the horizontal surface is engaged to the trench of the lower wall of the casing, and the upper half of the sealing ring above the horizontal surface is engaged to the trench in the bottom surface of the fixing disk so that the strips of the sealing ring are tightly adhered to the wall on the two sides of the contact trench. Therefore, a doubled sealing effect is obtained by a slightly pressing force. During assembling the aforementioned sealing structure, by the trenches having wider opening, the sealing ring can be engaged to the trench with a deeper depth so to be positioned therein. The structure of the present invention can be assembled easily.

The present invention will be better understood and its numerous objects and advantages will become apparent to those skilled in the art by referencing to the following drawings. Those skilled in the art should understand that these description only serves to embody the present invention, but not to confine the present invention. The spirit and scope of the present invention is fully defined with the appended claims in which:

DETAILED DESCRIPTION OF THE PREFERRED EMBODIMENT

Figure 1:
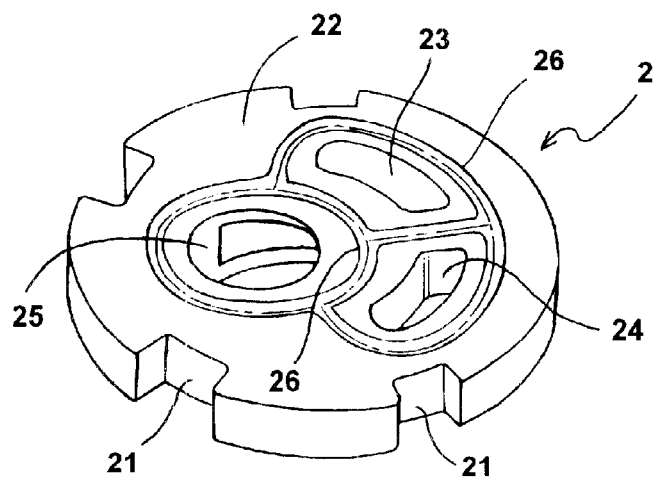
FIG. 1 is a perspective view of the fixing disk according to the present invention, wherein a trench for being engaged with the sealing ring are illustrated.
Figure 2:
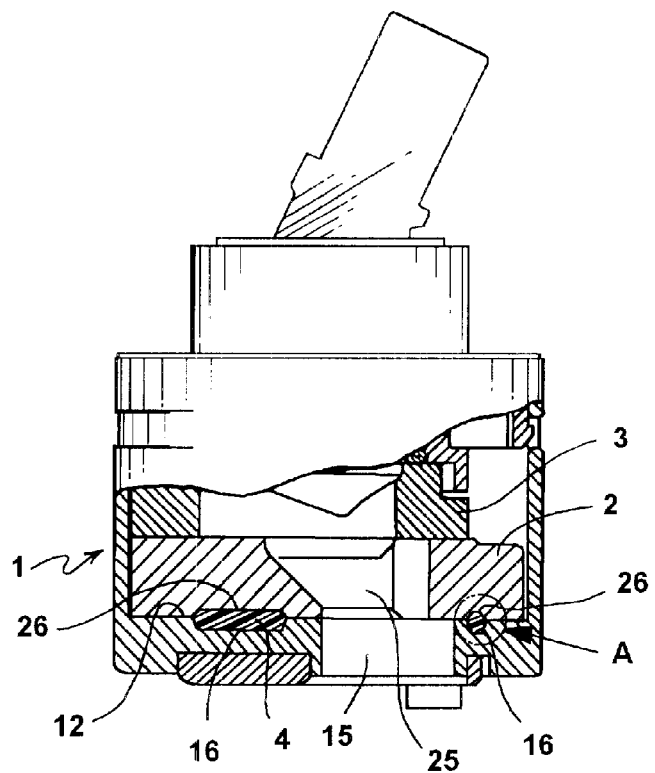
FIG. 2 is a partial cross sectional view showing the assembly of the present invention, wherein the assembly of the sealing ring, fixing disk and the lower wall of the casing is illustrated.

Referring now to FIGS. 1 and 2, the mixing valve casing 1 according to the present invention is illustrated. The mixing valve casing 1 comprises two overlapped ceramic disks 2 and 3 installed therewithin. The above moving disk 3 is controlled by a lever located thereabove so as to be moved in the horizontal direction of the fixing disk 2. The fixing disk 2 is slidably engaged with the rib (not shown) on the casing 1 by the guide groove 21 on the periphery of the disk 2.

The lower wall 12 of the casing 1 are penetrated through by water inlets (not shown) of hot and cool water and a water outlet 15 of mixing water. Besides, a concave trench 16 is formed on the upper surface of the lower wall 12 along the peripheral rims of the water inlets and water outlet and is retained with a proper distance with the peripheral rim of the water inlets and water outlet.

In the fixing disk 2, cool and hot water inlets 23 and 24, and a water outlet 25 for mixing water 25 with respect to the holes in the casing 1 are installed in the fixing disk 2. Besides, a concave trench 16 is formed on the bottom surface 22 along the peripheral rim of the water inlets and water outlet and is retained with a proper distance with the peripheral rim of the water inlet and water outlet. The cross section of the trench 26 has an inverse V shape. The shape of the trench 26 is completely symmetric to the trench 16 on the lower wall of the casing.

A sealing ring 4 is installed between the surface of the lower wall 12 of the casing and the bottom surface 22 of the fixing disk and has a symmetric shape with respect to aforesaid sealing ring 4. Thus, the sealing ring 4 can be engaged with the two trenches.

As the aforesaid components, the depths of the trench 16 on the lower wall of the casing and the trench 26 on the bottom surface of the fixing disk are smaller than one half of the strip thickness of the sealing ring 4. The depth of the trench 26 is smaller than that of the trench 16.

During assembling the aforementioned sealing structure, the sealing ring 4 can be engaged to the trench 16 with a deeper depth so to be positioned therein. The fixing disk 2 cover the structure downwards to press the sealing ring 4 so as to be tightly sealed within the trenches 16 and 26. Since the cross section of the trenches 16 and 26 has a V or inverse V shape, they have wider openings so that the sealing ring can be easily guided into the trenches. Therefore, during assembling, they are only necessary to be approximately aligned. During pressing the sealing ring into the trenches, the wider opening of the trench will guide the strips of the sealing ring 4 into the trenches 16 and 26. Therefore, in any condition, the assembly operation is conveniently, and the sealing ring will not be harmed so as to loss the effect of sealing.

Figure 3:
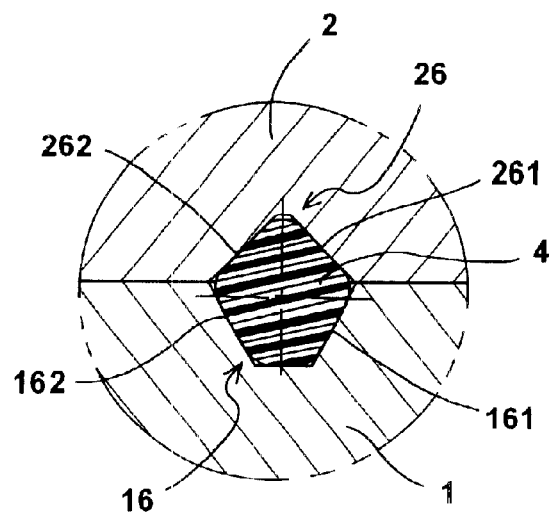
FIG. 3 is an enlarged view of the section in FIG. 2 illustrating the cross section of the trenches and the state that the sealing ring is assembled to the trenches.
Figure 4:
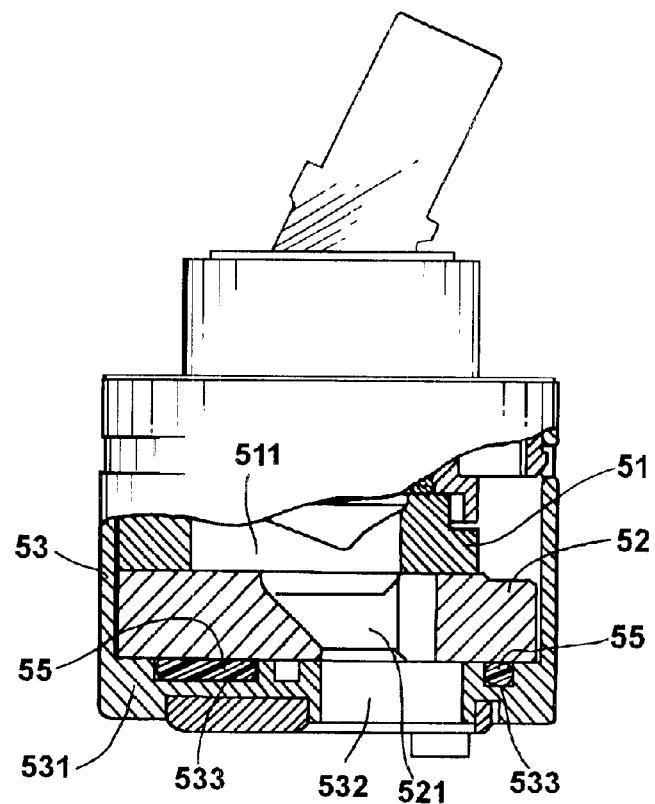
FIG. 4 is a partial cross section view of a prior art mixing valve illustrating that a prior art sealing ring is installed between the lower wall of the casing and the fixing disk.
Figure 5:
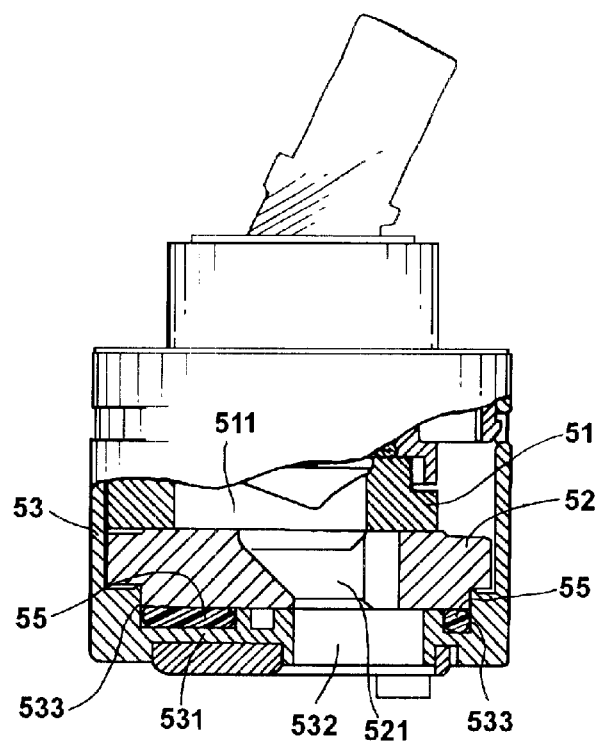
FIG. 5 is a partial cross sectional view of a prior art mixing valve showing that the rib of the fixing disk serve to press the sealing ring to the concave portion in the lower wall of the casing.
Figure 6:
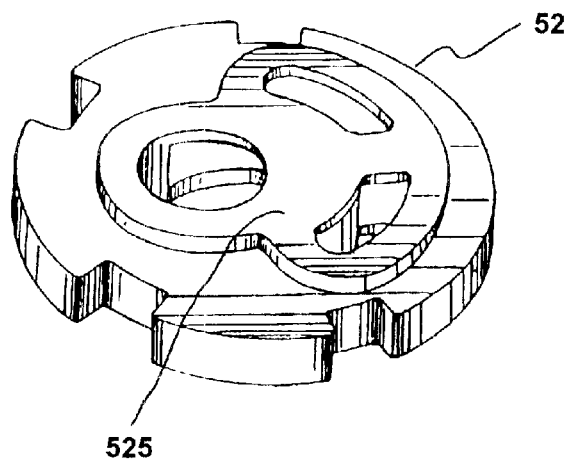
FIG. 6 is a perspective view of the fixing disk shown in FIG. 5, wherein the rib on the lower surface of fixing disk is illustrated.

Besides, as shown in FIG. 3, since the depths of the trenches 16 and 26 are smaller than one half of thickness of the strips in the sealing ring 4. Accordingly, when the sealing ring 4 is engaged into the trenches 16 and 26, it only needs a smaller pressure, the peripheral rim of the strips of the sealing ring 4 will deform so to be tightly adhered to the walls 161, 162, 261, and 262 at two sides of the trenches. Therefore, there are many contact surfaces. When water pressure is larger, by the walls at the two sides of the trenches to tightly secure the sealing ring, the sealing ring 4 will not displace by water pressure or outer force so as to loss sealing ability.

However, although in the present invention, the sealing effect is doubled, and the sealing ring is tightly located, but the original components is only changed a little. Therefore, the producing cost is saved greatly.

Although the present invention has been described using specified embodiment, the examples are meant to be illustrative and not restrictive. It is clear that many other variations would be possible without departing from the basic approach, demonstrated in the present invention.

What is claimed is:

1. A sealing structure for a hot and cold water mixing valve comprising:

a casing containing a moving disk and a fixing disk, said moving disk is installed so as to overlap said fixing disk, said moving disk is controlled by a lever affixed to said moving disk, said lever causes said moving disk to move in a horizontal plane relative to said fixing disk, said fixing disk is slidably engaged with said casing by a guide groove on a periphery of said fixing disk, said fixing disk further comprises a cold water inlet, a hot water inlet, and a water outlet, a sealing ring installed between an upper surface of a bottom wall of said casing and a bottom surface of said fixing disk; wherein a first trench is formed on said upper surface of said bottom wall of said casing along a peripheral rim of said water inlets and said water outlet, and a second trench is formed on said bottom surface of said fixing disk along said peripheral rim of said water inlets and said water outlet, said second trench has a shape conforming to a shape of said first trench, and said sealing ring has a shape conforming to said shapes of said first and said second trenches, such that said sealing ring is received in and fills said two trenches.

2. The sealing structure as claimed in claim 1, wherein:

a cross section of said first trench on said upper surface of said bottom wall of said casing approximates a V shape.

3. The sealing structure as claimed in claim 1, wherein:

a cross section of said second trench on said bottom surface of said fixing disk approximates an inverse V shape.

4. The sealing structure as claimed in claim 1, wherein:

a depth of said first trench on said upper surface of said bottom wall of said casing and a depth of said second trench on said bottom surface of said fixing disk are each less than one half the thickness of said sealing ring.

5. The sealing structure as claimed in claim 1, wherein:

a depth of said second trench on said bottom surface of said fixing disk is smaller than a depth of said first trench on said upper surface of said bottom wall of said casing.

\* \* \* \* \*